March 23, 1954 P. D. BECKER 2,672,660
FASTENER DEVICE
Filed March 16, 1949 2 Sheets-Sheet 1
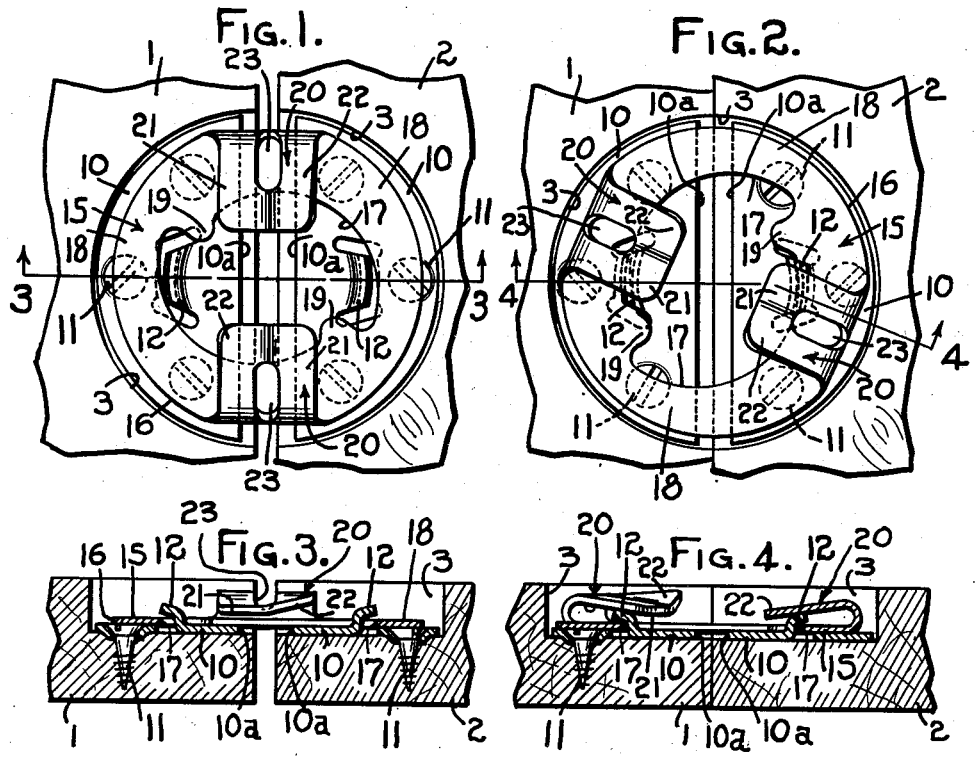
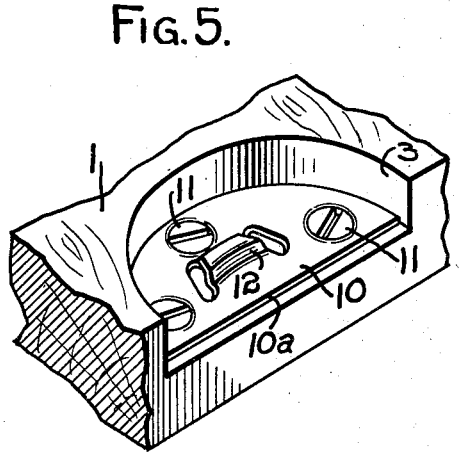
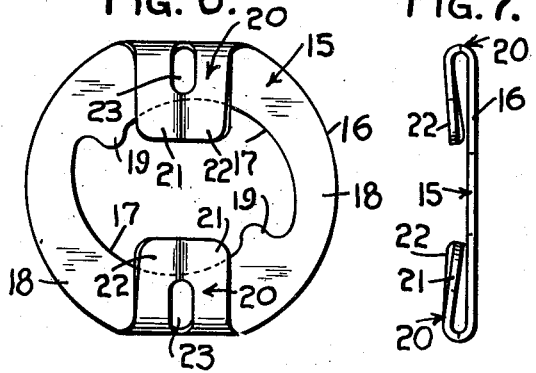
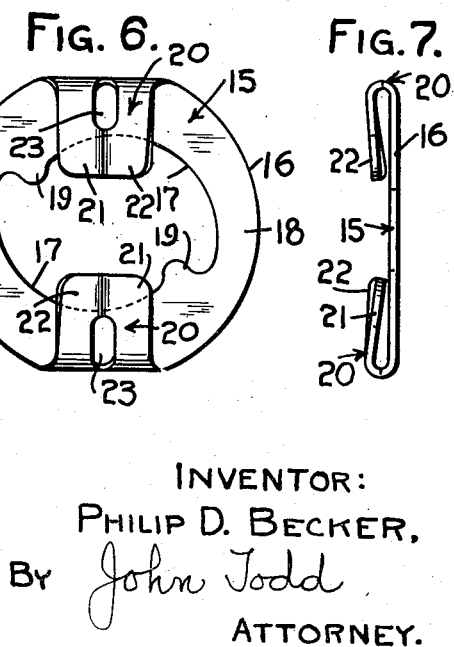
INVENTOR:
PHILIP D. BECKER,
BY John Todd
ATTORNEY.

March 23, 1954　　　P. D. BECKER　　　2,672,660
FASTENER DEVICE
Filed March 16, 1949　　　　　　　　　　　　　　2 Sheets-Sheet 2
FIG. 8.
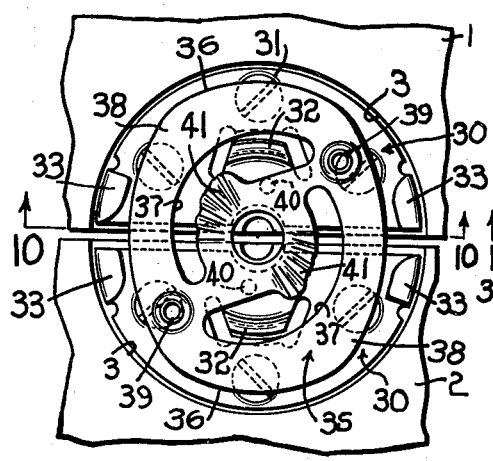
FIG. 9.
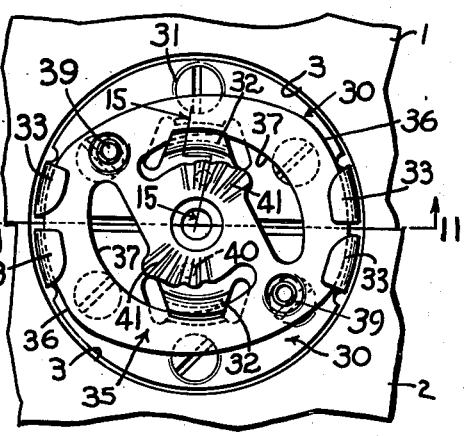
FIG. 10.
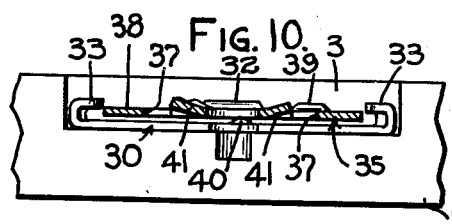
FIG. 11.
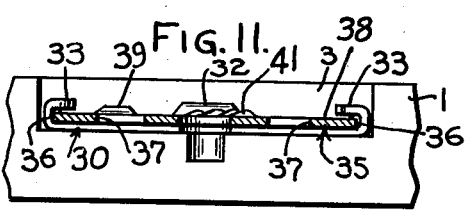
FIG. 12.
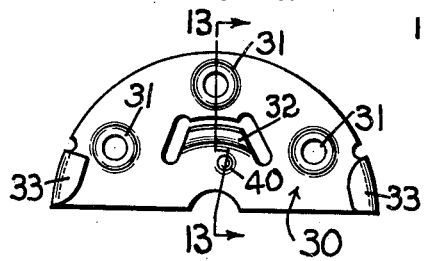
FIG. 15.
FIG. 14.
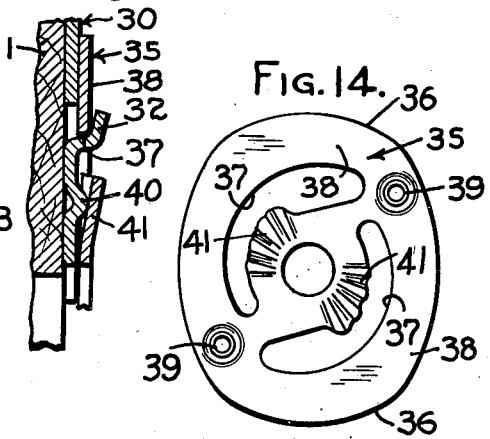
FIG. 13.
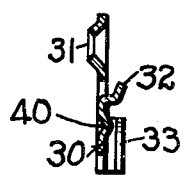
INVENTOR:
PHILIP D. BECKER,
By John Todd
ATTORNEY.

Patented Mar. 23, 1954

2,672,660

UNITED STATES PATENT OFFICE 2,672,660

FASTENER DEVICE

Philip D. Becker, Hingham, Mass., assignor to United-Carr Fastener Corporation, Cambridge, Mass., a corporation of Massachusetts Application March 16, 1949, Serial No. 81,657

14 Claims. (Cl. 20—92.6)

The present invention relates to fasteners, and more particularly to fasteners adapted to be interlocked and disengaged by relative rotary movement of the fastener elements, and aims generally to improve existing fasteners of that type.

One of the primary objects is the provision of an improved fastener member adapted to secure two parts in assembled juxtaposed relation.

A further object of the invention is the provision of an improved fastener means embodying a plurality of male fastener elements adapted to be secured to parts to be connected together, and a female fastener element adapted to be engaged with all of said male fastener elements for securing said parts in assembled relation.

A still further object of the invention is the provision of an improved fastener means adapted for securing together the frame members of buildings and like structures and which may readily be associated with said frame members as not to extend beyond the plane faces thereof.

A still further object of the invention is generally to improve and simplify the construction of fastener means of the above described types which may be economically manufactured, readily applied to the respective parts to be secured together, and quickly engaged and disengaged.

Other aims and advantages of the invention will be apparent to persons skilled in the art from a consideration of the accompanying drawings and annexed specification illustrating and describing several forms of fastener embodying the invention.

In the drawings:

Fig. 1 is a plan view of a fastener means according to one form of the invention for connecting two parts in juxtaposed relation, the female member being illustrated in its unfastened position with relation to the male member;

Fig. 2 is a plan view similar to Fig. 1, but illustrating the female member in fastened or locked position;

Fig. 3 is a vertical sectional view taken transversely of the fastener and the parts to be secured as on the line 3—3 of Fig. 1, illustrating the fastener parts in unlocked position;

Fig. 4 is a vertical sectional view, similar to Fig. 3, as taken on the line 4—4 of Fig. 2, illustrating the fastener parts in locked position;

Fig. 5 is a detail perspective view of one of the male fastener members of the type illustrated in Figs. 1 to 4, as applied to a part to be secured;

Fig. 6 is a plan view of the female fastener member of the type illustrated in Figs. 1 to 4;

Fig. 7 is an edge elevation of the female fastener member illustrated in Fig. 6;

Fig. 8 is a plan view of a modified and preferred form of fastener means for connecting two parts in juxtaposed relation, the female member being illustrated in its unfastened position with relation to the male member;

Fig. 9 is a plan view, similar to Fig. 8, but illustrating the female member in its fastened or locked position;

Fig. 10 is a vertical sectional view transversely through the fastener and longitudinally of a part to be secured, as taken on the line 10—10 of Fig. 8;

Fig. 11 is a vertical sectional view, similar to Fig. 10, but taken on the line 11—11 of Fig. 9;

Fig. 12 is a plan view of one of the male fastener members of the form illustrated in Figs. 8 to 11 inclusive;

Fig. 13 is a transverse sectional view through the male fastener member illustrated in Fig. 12, as taken on the line 13—13 thereof;

Fig. 14 is a plan view of the female fastener member illustrated in Figs. 8 to 11 inclusive; and Fig. 15 is a section on line 15—15 of Fig. 9.

Referring to the drawings, the invention is illustrated as embodied in a fastener for securing two parts 1 and 2 in juxtaposed relation. The parts 1 and 2 may be of any suitable type or construction, for example wood framing members of a building or like structure, which may be parts of prefabricated panels or units designed to be securely and detachably secured together. Each of the parts 1 and 2 may be provided with fastener recesses 3 in one face thereof and opening on an angularly disposed face adapted to abut a companion part of the assembled installation. As herein illustrated, the recesses 3 are of semi-circular shape.

Referring to the form of invention illustrated in Figs. 1 to 7 inclusive, a male fastener member 10 is secured in the recess 3 of each of the parts 1 and 2 by suitable means, as for example screws 11. The male fastener members advantageously conform to the shape of the recesses 3, and when arranged in pairs, as for example on juxtaposed parts 1 and 2, are supplementary to each other.

The male fastener member advantageously may be formed from a sheet metal plate of suitable thickness and strength, having an outwardly extending tongue 12 struck from the body of the plate, inwardly of the marginal edges thereof. The tongue 12 preferably presents an overhanging lip in the median plane of the member 10, and extending away from the meeting face 10ª thereof, which face is adapted to be disposed parallel to and adjacent the abutting faces of the parts 1 and 2.

A pair of supplementary male fastener members 10 is adapted to be fastened in juxtaposed position by a female fastener member 15, herein illustrated as comprising a ring-like plate having a circular outer peripheral edge 16 and opposed inner eccentric or cam means or edges 17. The body portion of the ring-like plate 15 thus presents opposed oppositely tapered arcuate locking portions 18 (see Fig. 6) adapted to be turned or rotated over the faces of a pair of female members 10. The eccentricity of the edges 17 is such as to provide a maximum internal diameter greater than the distance between opposed tongues 12 of a pair of male members 10, permitting the member 15 to be slipped over the tongues 12 (as shown in Fig. 1) and a minimum internal diameter of less than the distance between the opposed tongues, permitting the edge 17 to grip the tongues and be locked under the overhanging lips thereof as shown in Figs. 2 and 4. The inner peripheral edge of the female member 15 may be provided with stop means 19 between adjoining ends of the sections 18, so as to engage the tongues 12 of the male members and limit relative rotation thereof.

Advantageously, the female member 15 is provided with means to engage the male member 10 and resist relative rotation thereof in unlocking direction. Preferably, this rotation-retarding means may comprise wing members integral with and overlying the female member and presenting a yieldable surface for tensioned engagement with a locking tongue 12 of the male member 10. As illustrated, the wing members may be in the form of tab 20 integral with the outer peripheral edges of the female member and bent inwardly over the female member so that its terminal end 21 overlies the eccentric or clamping edge 17 adjacent a wider section of the tapered portions 18 of the female member. A corner of the tab 20, adjacent the narrower section of the portions 18 may be raised slightly as at 22 to facilitate moving that corner over the locking tabs 12. In fully locked position, the locking tongue 12 of the male member is engaged by the stop means 19 and by the lower corner or edge of the tab 20 so that a tensioned locking engagement is provided between the fastener parts, tending to restrain retrograde turning movement thereof.

The female member is preferably provided with suitable wrench-engaging means to effect turning thereof, and preferably such means may be in the form of apertures or openings 23, for example in the wings or tabs 20, adapted to receive pins or projections on a spanner or like wrench (not shown).

It will be apparent from the above description and the illustration in Figs. 1 to 4 of the drawings that the female members may be readily placed over the male members which have been placed in substantially aligned juxtaposed position as illustrated in Fig. 1. In this position, the narrower portions of the sections 18 having the greatest internal diameter are in line with opposed tongues 12. A spanner wrench may then be applied to the female member 15 with the prongs thereof engaging in apertures 23, and the female member 15 rotated to the locked position shown in Figs. 2 and 4. During rotation to the locked position, the inner eccentric peripheral edge 17 has engaged the tongues 12 forcing them and the parts 1 and 2 together, and the tabs 20 have been moved over the tongue 12 to exert a tensioned engagement therewith tending to restrain retrograde movement of the female member. The parts 1 and 2 are thus locked in secured assembled juxtaposed relation.

In the form of invention illustrated in Figs. 8 to 14 inclusive, the male fastener members 30 may be formed of sheet metal plate having apertures 31 for the reception of screws or like fastenings to secure the members 30 to the respective parts 1 and 2, and are provided with upstanding locking tongues 32 as in the case of the male fastener elements shown in Figs. 1 to 5.

The male fastener members preferably are also provided with bearing portions 33 extending angularly to the surface of the plate 30 and disposed at diametrically opposite points in a plane substantially normal to a transverse central plane passed through the locking tongue 32. As herein illustrated, the bearing portions 33 may be in the form of tabs extending angularly from the outer peripheral edge of the male members 30 and thence inwardly overlying the plate portion of the members 30 to provide channels for the reception of the female member 35.

The female member 35 advantageously is in the form of a sheet metal disc of elongated shape having arcuate concentric end edges 36 and an eccentric inner peripheral edge 37 providing therebetween oppositely tapered portions 38 extending across opposite ends of the elongated disc member 36. The maximum diameter of the member 35, i. e. between opposed concentric edges 36, will be equal to, at least, the maximum internal diameter between the bearing portions 33 of the male fastener members 30 and the minor diameter of the member 35 on the minor axis thereof, will be less than the internal diameter between the innermost ends of the inturned tabs when the channelled form of bearing 33 is used. This permits the female fastener member to be readily dropped or placed upon the male fastener members as illustrated in Fig. 8.

The eccentric inner peripheral edge 37 is spaced from the center of the disc 35 on the major diameter, a distance greater than the spacing of the locking tongue 32 from the free straight edge of the male member 30 so that in the unlocked position of the fastener the tongue 32 is free and slightly spaced from the inner peripheral edge 37 as illustrated in Fig. 8. The eccentric edge 37 which provides a cam edge for engagement extends radially inward toward the center of the disc on the minor axis or diameter so that when the minor diameter of the female member is in line with opposed locking tongues 32, as illustrated in Fig. 9, the edge 37 will be under the tongue and radially pressed against a face thereof.

Rotation of the female member 35 from the unlocked position shown in Fig. 8 to the locked position shown in Fig. 9 causes the concentric portions 38 to be moved within the channelled tabs 33 and bear against the inner upstanding faces thereof. This causes relative lateral shifting of the male members 30 to a position in which they are directly and accurately opposed and is highly desirable in cases of prefabricated structural members that must fit with precision. Rotation of the female member may be effected by means of a spanner or like wrench engaged in openings 39.

The cooperating male and female fastener parts 30 and 35 are preferably provided with interengaging means designed to prevent accidental or unintentional rotation of the female member 35 in unlocking direction from its locked or clamped position. One suitable means for this purpose comprises integral upstanding detents or protuberances 40 punched outwardly from the base of the male fastener members 30 and adapted to be engaged by a radially ribbed or corrugated portion 41 which may be integrally formed in the central portion of the female fastener member 35.

From the above description it will be seen that the invention provides a strong, efficient fastener of simple construction for securing a plurality of members in juxtaposed relation. The invention is particularly advantageous in connection with the assembly of building framing members, which when made of wood, are subject to some distortion and warping. In the form of invention shown in Figs. 1 to 7 inclusive rotation of the female fastener member to its locked position tends to draw the framing members tightly together, while the form of invention shown in Figs. 8 to 14 effects a similar drawing together of the framing member as well as a relative longitudinal shifting to properly align the members in juxtaposed position.

Although I have illustrated and described several preferred forms of the invention, I do not intend to be restricted thereto as the scope of the invention is best defined in the appended claims.

I claim:

1. A fastener for connecting a pair of parts in juxtaposed relation comprising: a pair of fastener plates, each plate having means for securing it to one of the parts to be connected and an outwardly extending locking element disposed within the marginal edges thereof, and a separate fastener member rotatable about an axis intermediate said first named fastener plates and having edge portions disposed on opposite sides of said axis defining opposed inwardly directed edges in engagement with opposite outer surfaces of said locking members and eccentrically disposed with respect to said axis and each other for drawing said locking elements toward each other upon rotation of said separate fastener member about said axis, said pair of fastener plates and said separate fastener member having cooperating means in sliding frictional engagement for resisting the engagement and disengagement of said separate fastener member with said pair of fastener plates.

2. A fastener for connecting a pair of parts in juxtaposed relation in accordance with claim 1 wherein the cooperating means in sliding frictional engagement of the pair of fastener plates and the separate fastener member comprise surfaces of said separate fastener member disposed in frictional engagement to opposing surfaces of said pair of fastener plates and other surfaces of said pair of fastener plates overlying said separate fastener member for holding said first mentioned surfaces in engagement with the surfaces opposed thereto.

3. A fastener for connecting a pair of parts in juxtaposed relation in accordance with claim 1 wherein the cooperating means in sliding frictional engagement of the pair of fastener plates and the separate fastener member comprise tongues extending from said separate fastener member and providing surfaces for sliding frictional engagement with surfaces of the locking elements of said pair of fastener plates and other surfaces on said locking elements overlying said separate fastener member for holding said separate fastener member in engagement with said pair of fastener members.

4. A fastener for connecting a pair of parts in juxtaposed relation in accordance with claim 1 wherein the cooperating means in sliding frictional engagement of the pair of fastener plates and the separate fastener member comprise tongues extending from said pair of fastener plates and overlying said separate fastener member when said fastener is in locked assembled relation and portions of said separate fastener member held in sliding frictional engagement by said tongues with opposed portions of said pair of fastener plates.

5. A fastener for connecting a plurality of parts in juxtaposed relation comprising a plurality of complementary fastener members, each having means for securing it to a part to be connected and each comprising a segmental body plate provided with an outwardly extending locking element disposed on a radius of said plate and within the marginal confines thereof, a cooperating plate-like fastener member having an opening provided with radially opposed eccentric edges in engagement with opposite outwardly directed surfaces of said locking elements and adapted to draw said locking elements radially inward toward each other upon rotation of said cooperating fastener member and locking means for frictionally securing said cooperating fastener member in engagement with said complementary fastener members.

6. A fastener for connecting a pair of parts in juxtaposed relation comprising a pair of fastener plates, each having means for securing it to a part to be connected, an integral outwardly extending locking element formed on each plate disposed within the marginal edges thereof and provided with an overhanging lip, a separate ring-like fastener member provided with a central opening to fit over the locking elements of said pair of plates, said opening having opposed inner edges eccentric to the axis of said ring-like member and in engagement with opposite outer surfaces under the lip of said locking elements, said ring-like fastener member being adapted upon rotation thereof to draw said plates radially toward each other, and rotation-resisting means disposed radially of said ring-like fastener member on a lesser diameter of said opening and adapted for tensioned engagement with said locking elements.

7. A fastener for connecting a pair of parts in juxtaposed relation comprising: a pair of fastener plates, each plate having means for securing it to one of the parts to be connected and an outwardly extending locking element disposed within the marginal edges thereof and providing an upstanding portion and a lip portion spaced from said plate and disposed substantially parallel thereto, and a separate flat ring-shaped fastener member rotatable about an axis intermediate said fastener plates and having inner edge portions disposed on opposite sides of said axis defining opposed inwardly directed edges in engagement with said upstanding portions and eccentrically disposed with respect to said axis and each other for drawing said upstanding portions and consequently said plates toward each other upon rotation of said separate fastener member about said axis, said separate fastener member having tongues disposed on opposite outer peripheral edge portions and overlying and frictionally engaging said lip portions of said locking elements when said separate fastener member has been rotated to secure said fastener plate in secured connected relation.

8. A fastener for connecting a plurality of parts in juxtaposed relation comprising: a plurality of fastener plates, each plate having means for securing it to one of the parts to be connected, an outwardly extending locking element disposed within the marginal edges thereof, and upstanding bearing portions at opposite marginal edges thereof; and a separate fastener member rotatable about an axis intermediate said first named fastener plates and having edge portions disposed on opposite sides of said axis defining opposed inwardly directed edges in engagement with radially outer surfaces of said locking members and eccentrically disposed with respect to said axis and each other for drawing said locking elements toward each other upon rotation of said separate fastener member about said axis and having other edge portions disposed on opposite sides of said axis defining radially outwardly directed edges in engagement with the radially inner edges of said bearing portions for securing said bearing portions and consequently said fastener plates in spaced and aligned relation upon the rotation of said separate fastener member.

9. A fastener for connecting a pair of parts in juxtaposed relation comprising: a pair of fastener plates, each plate having means for securing it to one of the parts to be connected and upstanding bearing portions at opposite ends thereof; and a separate fastener member rotatable about an axis intermediate said first named fastener plates and having edge portions disposed on opposite sides of said axis defining opposite outwardly directed edges in engagement with the diametrically opposing inner edges of said bearing portions for securing said bearing portions and consequently said fastener plates in spaced and aligned relation upon rotation of said separate fastener member.

10. A fastener for connecting a pair of parts in juxtaposed relation comprising: a pair of fastener plates, each plate having means for securing it to one of the parts to be connected, an outwardly extending locking element disposed within the marginal edges thereof, and upstanding bearing portions at opposite ends thereof; and a separate fastener member rotatable about an axis intermediate said first named fastener plates and having edge portions disposed on opposite sides of said axis defining opposed inwardly directed edges in engagement with opposite outer surfaces of said locking members and eccentrically disposed with respect to said axis and each other for drawing said locking elements toward each other upon rotation of said separate fastener member about said axis, said separate fastener member having other edge portions disposed on opposite sides of said axis defining opposite outwardly directed edges in engagement with diametrically opposing inner edges of said bearing portions for securing said bearing portions and consequently said fastener plates in spaced and aligned relation upon the rotation of said separate fastener member.

11. A fastener for connecting a pair of parts in juxtaposed relation comprising: a pair of fastener plates, each plate having means for securing it to one of the parts to be connected, an outwardly extending locking element disposed within the marginal edges thereof, and upstanding bearing portions at opposite ends thereof; and a separate fastener member rotatable about an axis intermediate said first named fastener plates and having edge portions disposed on opposite sides of said axis defining opposed inwardly directed edges in engagement with opposite outer surfaces of said locking members and eccentrically disposed with respect to said axis and each other for drawing said locking elements toward each other upon rotation of said separate fastener member about said axis, said separate fastener member having other edge portions disposed on opposite sides of said axis defining concentric opposite outwardly directed edges in engagement with diametrically opposing inner edges of said bearing portions for securing said bearing portions and consequently said fastener plates in spaced and aligned relation upon the rotation of said separate fastener member.

12. A fastener for connecting a pair of parts in juxtaposed relation comprising: a pair of fastener plates, each plate having means for securing it to one of the parts to be connected, an outwardly extending locking tongue disposed within the marginal edges thereof, and upstanding bearing portions at opposite ends thereof, said bearing portions having inwardly opening channels; and a separate fastener member rotatable about an axis intermediate said first named fastener plates and having edge portions disposed on opposite sides of said axis defining opposed inwardly directed edges in engagement with opposite outer surfaces of said locking members and eccentrically disposed with respect to said axis and each other for drawing said locking elements toward each other upon rotation of said separate fastener member about said axis and having other edge portions disposed on opposite sides of said axis defining concentric opposite outwardly directed edges in engagement within the channels of said bearing portions for securing said bearing portions and consequently said fastener plates in aligned relation upon the rotation of said separate fastener member.

13. A fastener for connecting a pair of parts in juxtaposed relation in accordance with claim 12 wherein the fastener plates and the separate fastener member have cooperating means for resisting relative rotation of said separate fastener member and said plates from their locked position.

14. A fastener for connecting a pair of parts in juxtaposed relation in accordance with claim 12 wherein the separate fastener member has a centrally disposed series of radial ribs and the fastener plates have upstanding projections engaging said radial ribs for resisting relative rotation of said separate fastener member and said plates from their locked positions.

PHILIP D. BECKER.

References Cited in the file of this patent
UNITED STATES PATENTS

| Number | Name | Date |
|---|---|---|
| 279,267 | Nock | June 12, 1883 |
| 309,310 | Neale | Dec. 16, 1884 |
| 590,325 | Leslie | Sept. 21, 1897 |
| 798,296 | Praeger | Aug. 29, 1905 |

FOREIGN PATENTS

| Number | Country | Date |
|---|---|---|
| 36,883 | Sweden | of 1914 |